(12) United States Patent
Stokkermans et al.

(10) Patent No.: US 9,994,407 B2
(45) Date of Patent: *Jun. 12, 2018

(54) SYSTEM AND METHOD FOR PROCESSING A FLEXIBLE SUBSTRATE

(71) Applicant: NXP B.V., Eindhoven (NL)

(72) Inventors: Jozef P. W. Stokkermans, Nijmegen (NL); Tom Kampschreur, Arnhem (NL); Theodorus ter Steeg, Nijmegen (NL); Patrick J. M. Houben, Helden (NL)

(73) Assignee: NXP B.V., Eindhoven (NL)

( * ) Notice: Subject to any disclaimer, the term of this patent is extended or adjusted under 35 U.S.C. 154(b) by 250 days.

This patent is subject to a terminal disclaimer.

(21) Appl. No.: 14/935,185

(22) Filed: Nov. 6, 2015

(65) Prior Publication Data

US 2017/0129731 A1    May 11, 2017

(51) Int. Cl.
| | |
|---|---|
| *B65H 20/12* | (2006.01) |
| *B65H 23/24* | (2006.01) |
| *B65G 47/90* | (2006.01) |

(52) U.S. Cl.
CPC ........... *B65H 23/245* (2013.01); *B65G 47/90* (2013.01); *B65H 20/12* (2013.01); *B65H 2301/4491* (2013.01); *B65H 2406/351* (2013.01); *B65H 2701/1942* (2013.01)

(58) Field of Classification Search
CPC ....... B65H 23/245; B65H 20/12; B65G 47/90
See application file for complete search history.

(56) References Cited

U.S. PATENT DOCUMENTS

| | | | |
|---|---|---|---|
| 3,489,325 A * | 1/1970 | Epstein ................... | B21C 47/34 226/15 |
| 4,326,656 A * | 4/1982 | Gregory ................... | B41J 15/16 226/195 |
| 5,685,471 A | 11/1997 | Taubenberger | |
| 5,779,184 A | 7/1998 | Kaufmann et al. | |
| 6,003,420 A | 12/1999 | Wakabayashi et al. | |
| 2007/0137031 A1 | 6/2007 | Bosch et al. | |
| 2008/0061275 A1 | 3/2008 | Stokkermans | |
| 2010/0223767 A1 | 9/2010 | Vianen et al. | |
| 2011/0120756 A1 | 5/2011 | Ambo et al. | |

FOREIGN PATENT DOCUMENTS

| | | |
|---|---|---|
| CH | 325428 | 11/1957 |
| EP | 1721750 A1 | 11/2006 |
| GB | 2067524 A | 7/1981 |
| JP | 2000235267 A | 8/2000 |
| WO | 2010082441 A1 | 7/2010 |
| WO | 2013186745 A2 | 12/2013 |

OTHER PUBLICATIONS

"Web Guiding Systems ELGUIDER"; http://www.erhardt-leimer.com/index/Grossbritannien/GB+Web+Guiding+Systems+ELGUIDER--1799.html; retrieved from the internet Nov. 6, 2015.

* cited by examiner

*Primary Examiner* — Sang K Kim (57) ABSTRACT

A processing system and a method for processing a flexible substrate (e.g., a web) use a tensioner with a vacuum plate that can be moved along a transport direction of the flexible substrate with an indexer that intermittently moves the flexible substrate for processing. The tensioner and the indexer are controlled so that a relative speed between the indexer and the vacuum plate of the tensioner is maintained above a predefined threshold under all working conditions, even when the flexible substrate is stopped.

20 Claims, 9 Drawing Sheets

SYSTEM AND METHOD FOR PROCESSING A FLEXIBLE SUBSTRATE

BACKGROUND

Certain types of electronic products may be manufactured on flexible substrates, such paper or plastic substrates (e.g., polymer textile carriers), which is sometimes referred to as a "web". Using such a web allows the electronic products to be manufactured in high volume and in an efficient manner. In most common web applications, the web is transported continuously through a web processing system. However, in some web applications, the web may need to intermittently stopped within the web processing system to perform some processing operation on the web. For these types of web applications, accurate positioning of the web for repeated execution of the processing operation when the web is temporarily stopped is very important. However, varying friction between the web and components of the processing system presents a significant challenge in achieving high precision accuracy of the web position within in the processing system.

SUMMARY

A processing system and a method for processing a flexible substrate (e.g., a web) use a tensioner with a vacuum plate that can be moved along a transport direction of the flexible substrate with an indexer that intermittently moves the flexible substrate for processing. The tensioner and the indexer are controlled so that a relative speed between the indexer and the vacuum plate of the tensioner is maintained above a predefined threshold under all working conditions, even when the flexible substrate is stopped.

A processing system in accordance with an embodiment of the invention comprises a tensioner with a vacuum plate configured to provide tension on a flexible substrate as the flexible substrate is transported over the vacuum plate along a transport direction, the vacuum plate being configured to be moved along the transport direction, an indexer configured to intermittently move the flexible substrate for processing, and a controller configured to control the tensioner and the indexer so that a relative speed between the indexer and the vacuum plate of the tensioner is maintained above a predefined threshold under all working conditions, even when the flexible substrate is stopped.

In an embodiment, the controller is configured to move the vacuum plate of the tensioner in the opposite direction of the transport direction when the indexer is stopped.

In an embodiment, the controller is configured to move the vacuum plate of the tensioner so that the relative speed between the indexer and the vacuum plate of the tensioner is maintained in a linear region of the Stribeck curve.

In an embodiment, the processing system further comprises a processing device that performs a process on the flexible substrate on the indexer when the indexer is stopped.

In an embodiment, the processing device is a pick-and-place device that places a device onto the flexible substrate.

In an embodiment, the indexer includes a drum with vacuum holes to move the web as the drum is rotated.

In an embodiment, the indexer is a linear indexer.

In an embodiment, the tensioner has a curved surface that can be moved in a rotational direction.

In an embodiment, the flexible substrate is made of paper, plastic or metal.

A processing system in accordance with another embodiment of the invention comprises a web tensioner with a vacuum plate configured to provide tension on a web as the web is transported over the vacuum plate along a transport direction, the vacuum plate being configured to be moved along the transport direction, a web indexer including a drum with vacuum holes, the drum being configured to be intermittently rotated to move the web, a processing device configured to process the web on the drum of the web indexer, and a controller configured to control the web tensioner and the web indexer so that a relative speed between the drum of the web indexer and the vacuum plate of the web tensioner is maintained above a predefined threshold under all working conditions, even when the web is stopped.

In an embodiment, the controller is configured to move the vacuum plate in the opposite direction of the transport direction when the drum of the web indexer is stopped.

In an embodiment, the controller is configured to move the vacuum plate of the web tensioner so that the relative speed between the drum of the web indexer and the vacuum plate of the web tensioner is maintained in a linear region of the Stribeck curve.

In an embodiment, the processing device is a pick-and-place device that places a device onto the web on the drum of the web indexer.

A method for processing a flexible substrate in accordance with an embodiment of the invention comprises supplying a flexible substrate to an indexer through a tensioner with a vacuum plate so that the flexible substrate is transported over the vacuum plate, intermittently moving the flexible substrate along a transport direction for processing, and moving the vacuum plate of the tensioner along the transport direction so that a relative speed between the indexer and the vacuum plate of the tensioner is maintained above a predefined threshold under all working conditions, even when the flexible substrate is stopped.

In an embodiment, the moving of the vacuum plate of the tensioner includes moving the vacuum plate of the tensioner in the opposite direction of the transport direction when the indexer is stopped.

In an embodiment, the moving of the vacuum plate of the tensioner includes moving the vacuum plate of the tensioner so that the relative speed between the indexer and the vacuum plate of the tensioner is maintained in a linear region of the Stribeck curve.

In an embodiment, the method further comprises performing a process on the flexible substrate on the indexer when the indexer is stopped.

In an embodiment, the processing of the flexible substrate includes placing a device onto the flexible substrate.

In an embodiment, the intermittently moving of the flexible substrate at the indexer includes rotating a drum with vacuum holes of the indexer to move the flexible substrate.

In an embodiment, the intermittently moving of the flexible substrate at the indexer includes linearly moving the flexible substrate at the indexer.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
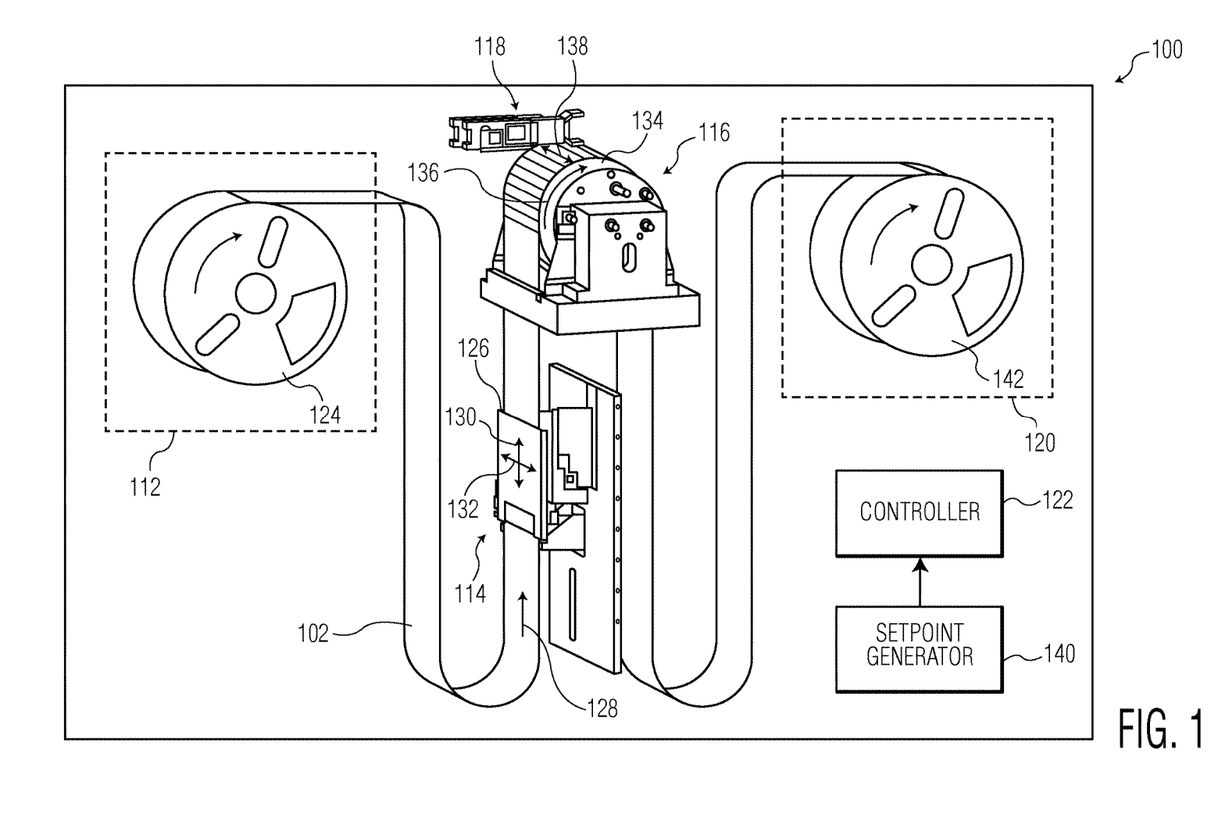
FIG. 1 is a schematic diagram of a processing system in accordance with an embodiment of the invention.

FIG. 1 shows a processing system 100 in accordance with an embodiment of the invention is shown. The processing system operates on a flexible substrate 102, which is referred to herein as a "web". The flexible substrate can be made of any flexible material. As an example, the flexible substrate may be, but not limited to, a long strip of paper, a long strip of polymer textile carrier or a long strip of flexible metal. In some applications, the web may include electrical structures or traces formed thereon. The processing system is designed to transport and guide the web through the processing system so that one or more processes can be performed on the web, such as pick-and-place process of integrated circuit (IC) chips or other electronic components onto the web. As described in more detail below, the processing system operates to transport the web through the processing system in a high precision manner.

Figure 2:
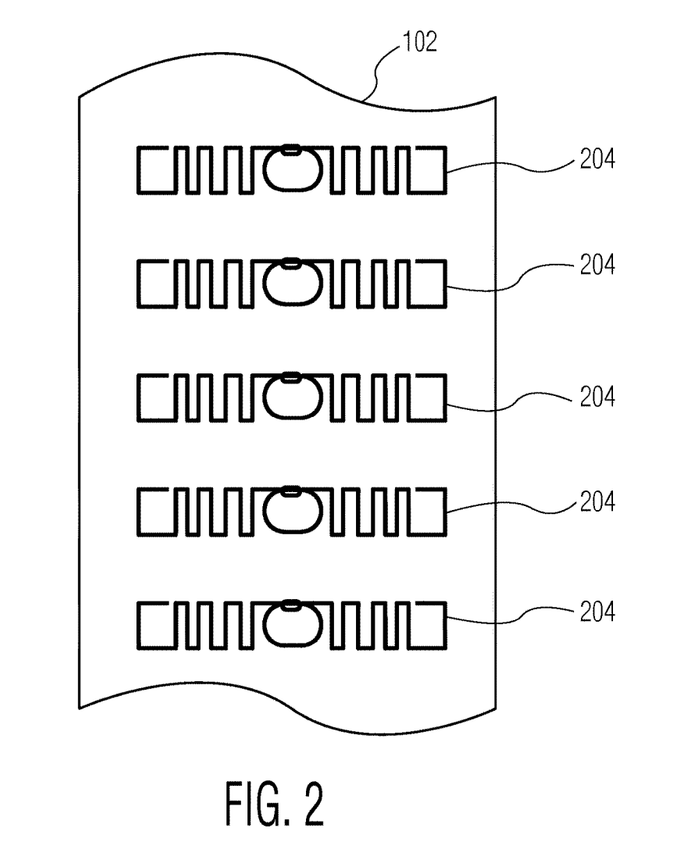
FIG. 2 show an example of a web that can be used in the processing system of FIG. 1.

An example of the web 102, which can be used in the processing system 100, is depicted in FIG. 2. As shown in FIG. 2, the web includes a number of electrical structures 204 that are separated from each other by some distance. These electrical structures can be any type of flexible electronics. These electrical structures are fabricated on the web prior to the web being processed by the processing system. In some applications, a device may need to be placed on each of the electrical structures at a precise location. Thus, accurately transporting the web through the processing system so that the device can be precisely placed at the designated placement location on the web is very important.

Turning back to FIG. 1, the processing system 100 includes a de-reeling unit 112, a web tensioner 114, a web indexer 116, a processing device 118, a reeling unit 120, and a controller 122. In FIG. 1, various support structures for the different components of the processing system are not shown in order to not obscure the inventive features of the system. As shown in FIG. 1, the web 102 is being processed by the processing system, and thus, is transported and guided through the various components of the processing system. In particular, the web is transported from the de-reeling unit to the reeling unit through the web tensioner and the web indexer so that the web can be processed by the processing device at the web indexer. The web tensioner, the web indexer and the processing device can be viewed as being a web processing set. In the illustrated embodiment, the processing system includes only one web processing set. However, in other embodiments, the processing system may include one or more additional web processing sets.

The de-reeling unit 112 of the processing system 100 operates to de-reel a roll of the web 102, which is typically rolled on a terminal reel 124, to be processed. The de-reeling unit supplies the web to the next module (i.e., the web tensioner 114) without tension. The de-reeling unit includes mechanisms to hold and rotate the terminal reel 124 so that the web can be de-reeled. These mechanisms can be commonly found in conventional processing systems, and thus, are not illustrated or described in detail herein.

Figure 3:
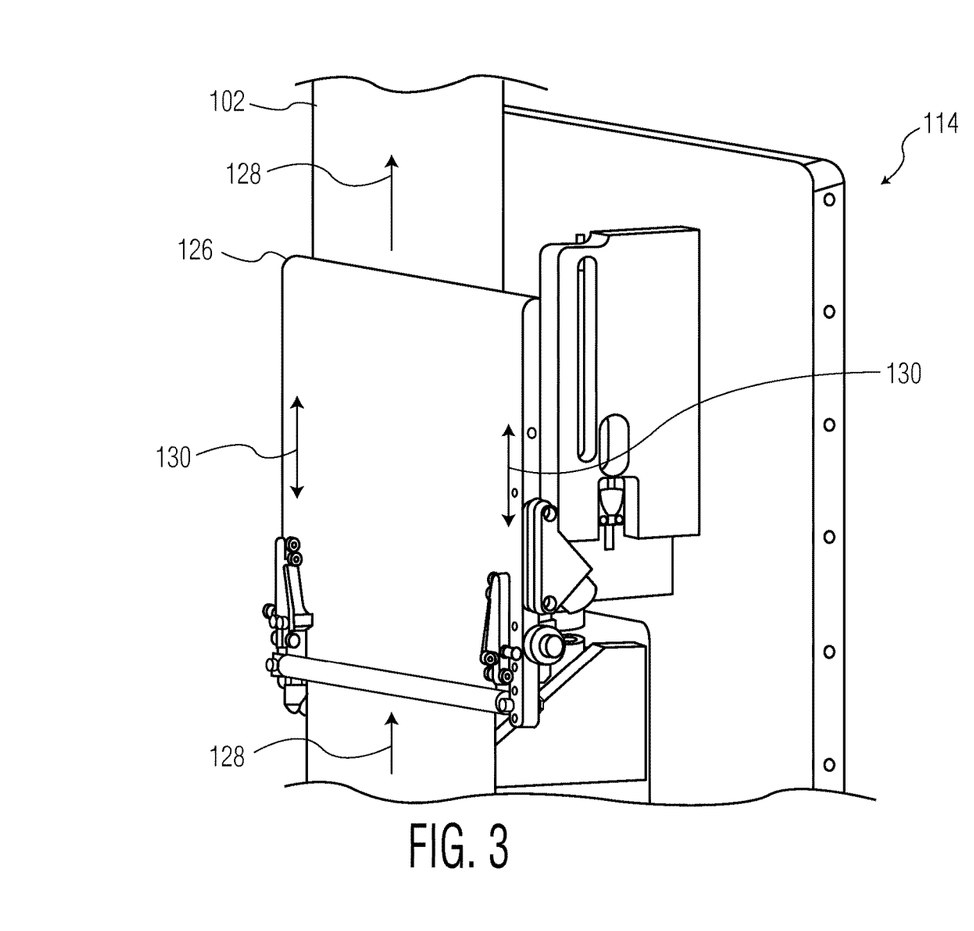
FIG. 3 is an enlarged view of a web tensioner of the processing system in accordance with an embodiment of the invention.

The web tensioner 114 of the processing system 100 operates to provide tension on the web 102 so that the movement of the web through the system, in particular, at the web indexer 116, can be controlled with high precision. In an embodiment, the web tensioner 114 includes a vacuum plate or table 126 that pulls or attracts the web using suction or negative gas pressure, as best shown in FIG. 3. The suction on the web from the vacuum plate provides tension on the web, while still allowing the web to move or travel along a transport direction, which is indicated by arrows 128. The vacuum plate includes a number of holes, which are connected to a vacuum pump (not show) that provides the suction. The vacuum plate is designed to move forward and reverse in the transport direction, as indicated by double arrows 130. As described in more detail below, a controlled movement of the vacuum plate allows the web to be transported and guided with high precision. In order for the vacuum plate to move, the vacuum plate is connected to one or more drive mechanisms, such as motors, that can displace the vacuum plate with desired velocity in the desired direction. In some embodiments, the vacuum plate is further designed to move in the lateral direction with respect to the transport direction, i.e., in the direction orthogonal to the transport direction, as indicated by a double arrow 132 (See FIG. 1), in order to control the lateral movement of the web. With sufficient tension on the web in the transport direction, the web will not significantly shift in the lateral direction when the web is indexed or moved by the web indexer 116. In the embodiment shown in FIGS. 1 and 3, the web tensioner includes the plate that has a flat surface for interfacing with the web. However, in other embodiments, the web tensioner may include a component with a curved surface for interface with the web, such as a drum. In these embodiments, the curved surface of the web tensioner may be moved in a rotational direction, rather than in a linear direction. In still other embodiments, the web tensioner may be implemented as one or more rollers that provide tension on the web.

The web indexer 116 of the processing system 100 operates to index or precisely transport the web 102 so that a specific location or spot of the web is displaced to a desired processing location. For example, the web can be moved so that a designated location on one of the electrical structures 204 (see FIG. 2) on the web is aligned with a particular position so that a device can be placed at the designated location. In the illustrated embodiment, the web indexer includes a circular drum 134 with multiple vacuum holes that pulls or attracts the web using suction or negative gas pressure, similar to the web tensioner 114. The suction on the web from the drum allows the drum to transport or move the web in the transport direction when the drum is rotated in the transport direction. The vacuum holes of the drum are connected to a vacuum pump (not show), which can be the same vacuum pump used for the web tensioner, that provides the suction. In some embodiments, the vacuum of the drum may differ from the vacuum of the vacuum plate 126 of the web tensioner. As an example, the vacuum of the vacuum plate may be less than the vacuum of the drum. The reason for difference is that the drum vacuum only needs to fix the web on the drum, and therefore, can be maximized. In contrast, the vacuum plate vacuum is used to create a certain hold force to create tension in the web when the web moves over the vacuum, and therefore, can be less than the drum vacuum. In order for the drum to be rotated, the drum is connected to one or more drive mechanisms, such as motors, that can rotate the drum in a controlled manner. In some embodiments, the drum is further designed to move in the lateral direction with respect to the transport direction, i.e., in the direction orthogonal to the transport direction, as indicated by a double arrow 138 in FIG. 1, in order to control the lateral movement of the web.

Figure 4:
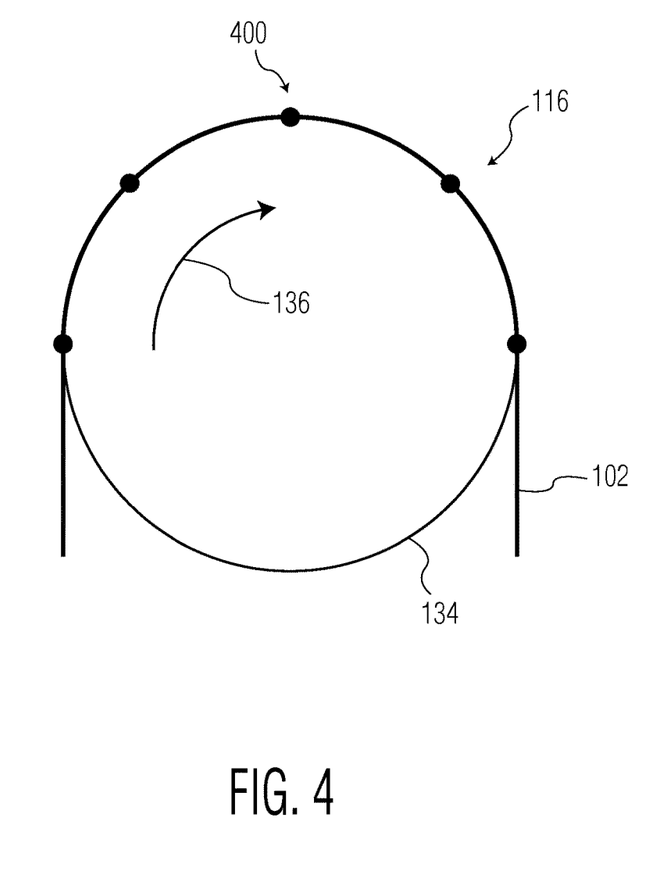
FIG. 4 illustrates the rotation of a drum of a web indexer of the processing system in accordance with an embodiment of the invention.

The web indexer 116 is able to index the web 102 (i.e., to transport the web over the pitch distance) by rotating the drum 134, which is illustrated in FIG. 4. As shown in FIG. 4, the drum of the web indexer is rotated in the clockwise direction that corresponds to the transport direction (indicated by an arrow 136), which also moves the web in the same direction. In this embodiment, the web is transported by the rotation of the drum so that a specific spot of the web, e.g., a die placement location on one of the antenna structures 204 (see FIG. 2), is moved to a process position 400 at a particular moment in time. In particular, the web is transported or moved intermittently by the drum so that the desired areas of the web can be sequentially stopped at the process position for processing. As an example, the web may be stopped and started several times per second. In order for the desired areas of the web to be stopped at the process position at the right moments in time, the web must be accurately transported by the drum.

Figure 5:
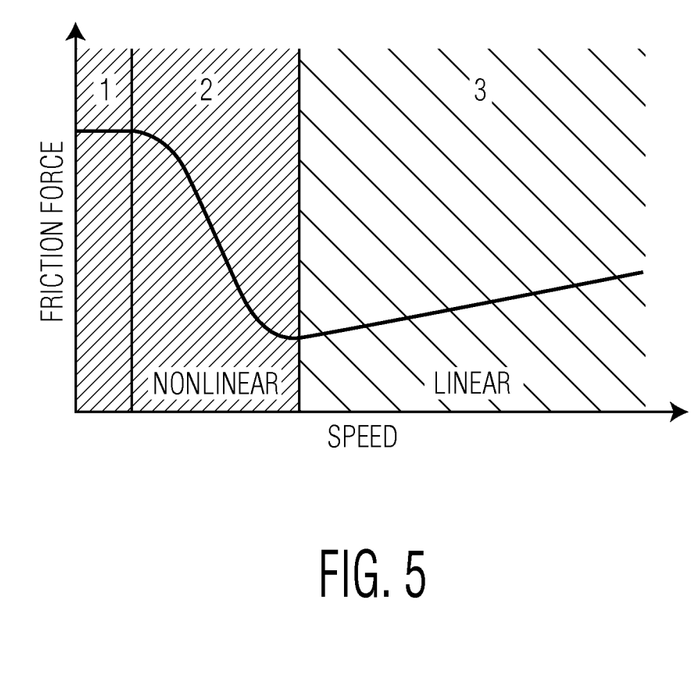
FIG. 5 shows a Stribeck curve with nonlinear and linear zones.

Accurate transport of the web 102 can be obtained by accurate position measurement of the web and accurate control of the web indexer 116. Accurate control of the web indexer position can be obtained by means of high bandwidth control loops and accurate feed forward. Feed forward compensates for known forces such as acceleration forces and frictional forces. However, frictional forces are difficult to compensate because the frictional force depends on speed in a quite complex fashion, as defined by the Stribeck curve, which is shown in FIG. 5. The Stribeck curve shows that frictional force at low speeds (zones 1 and 2 in FIG. 5) is quite nonlinear and non-reproducible. Above a certain speed, however, the frictional force is quite linear with speed (zone 3 in FIG. 5).

Figure 6:
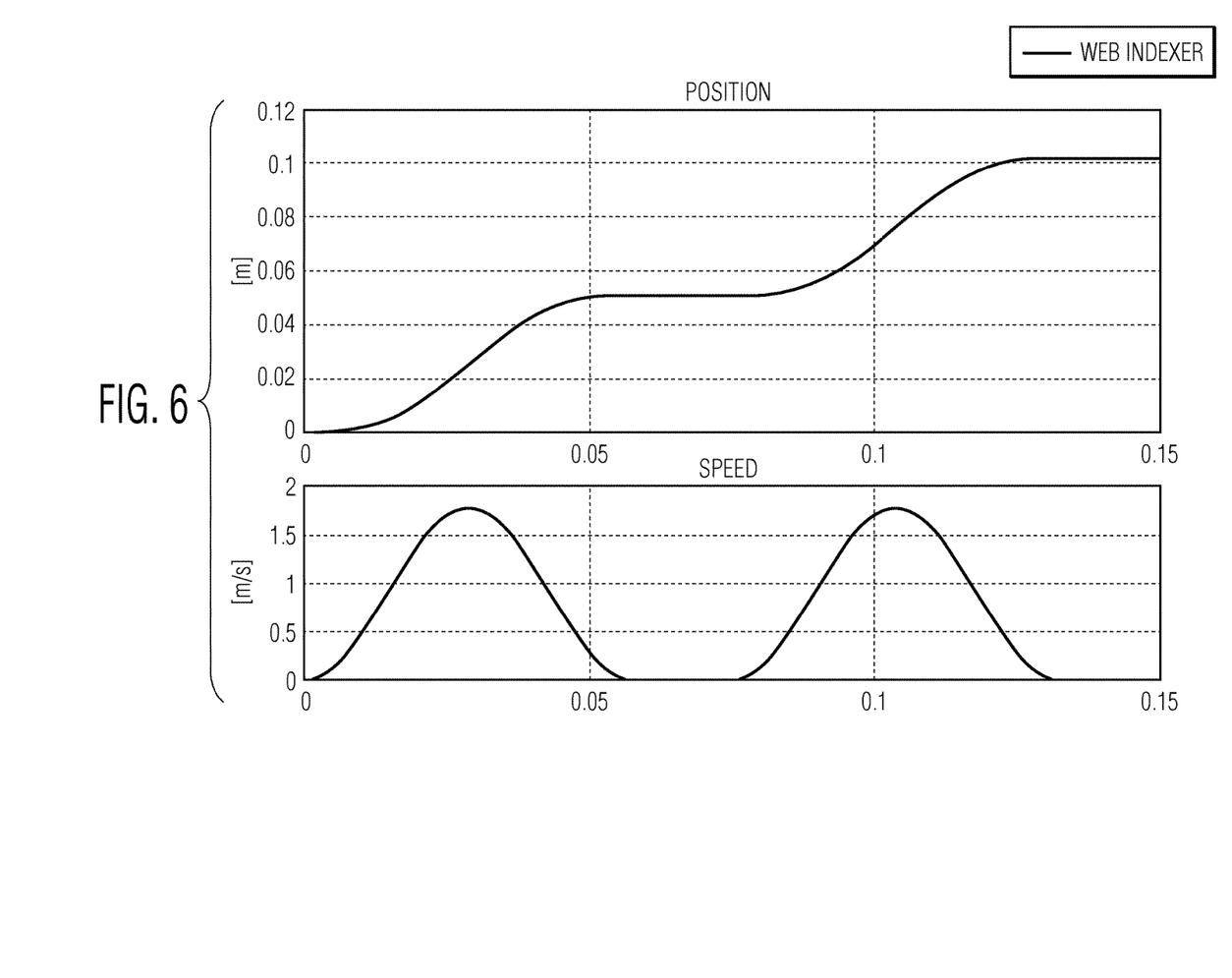
FIG. 6 is graph showing position and speed of the web indexer when the web tensioner uses a static vacuum plate.

The frictional force that needs to be compensated by a feed forward depends on the relative speed between the speed of the web tensioner 114 and the rotational speed of the web indexer 116 (i.e., the speed of the drum surface). If the web tensioner uses a static vacuum plate, which is easiest to implement, the relative speed between the web tensioner and the web indexer would vary from zero to the maximum transport speed, as illustrated in FIG. 6. In this case, the frictional force would have a typical Stribeck behavior, which is difficult to compensate due to the non-repetitive behavior around zero speed, i.e., when the web indexer is stopped. That is, the web will initially stick to the web tensioner with high friction and then will switch to a lower friction after the web achieves a certain velocity with respect to the web tensioner.

In order to overcome this difficulty, the vacuum plate 126 of the web tensioner 114 is moved in the reversed transport direction with specific speed profile so that the relative speed between the web tensioner and the web indexer 116 can be kept at nonzero speeds. If the relative speed is nonzero above a certain threshold, the frictional force can be compensated with a simple predictable linear compensation yielding a better position accuracy in the end. That is, if the relative speed threshold is maintained in the linear zone of the Stribeck curve, i.e., zone 3 of the Stribeck curve, the compensation for the frictional force is much easier. Thus, when the drum 134 of the web indexer is stopped so that a process can be performed on the web, the vacuum plate of the web tensioner moves in the opposite direction of the transport direction to keep a constant velocity between the web and the vacuum plate. So when the drum of the web indexer starts to move again, the frictional force at the web tensioner is still in the linear zone of the Stribeck curve. If the frictional force at the web tensioner is maintained in the Stribeck linear zone when the drum of the web indexer is stopped, then accurate web position is much easier to achieve for the next cycle (i.e., when the web is stopped again) by the processing system 100.

Figure 7:
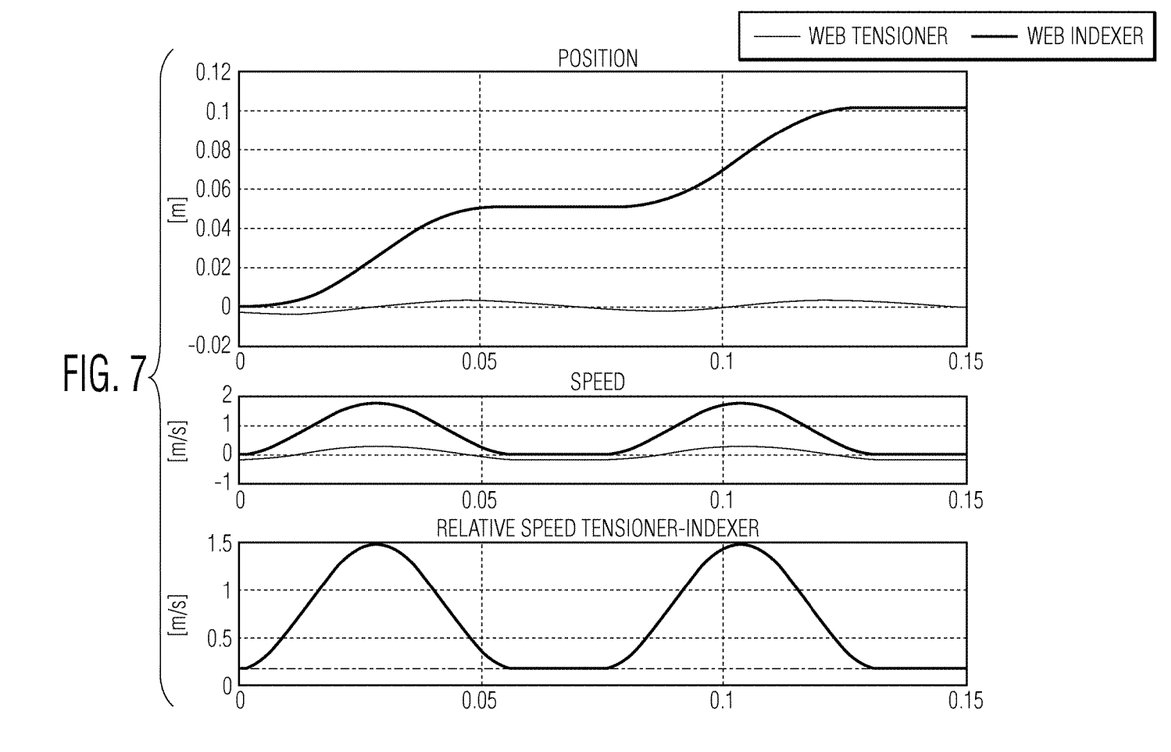
FIG. 7 is graph showing position and speed of the web indexer and the web tensioner when the web tensioner uses a movable vacuum plate in accordance with an embodiment of the invention.

In an embodiment, the processing system 100 includes a setpoint generator 140 that creates a motion profile for the vacuum plate 126 of the web tensioner 114, which is synchronous with the movements of the web indexer 116 (i.e., the rotational movement of the drum 134), in order to control the relative speed between the web tensioner and the web indexer. The motion profile is created such that the average speed of the web tensioner is zero and the speed of the web tensioner is lower than zero, i.e., moving in the negative transport direction, if the web indexer speed is zero. As used herein, the speed of the web tensioner refers to the speed of the vacuum plate 126 of the web tensioner and the speed of the web indexer refers to the rotational speed of the drum 134 of the web indexer. In addition, the motion profile is created such that the relative speed between the web indexer and the web tensioner is maintained above a certain threshold so that the frictional force between the web tensioner and the web is in the linear zone of the Stribeck curve, i.e., zone 3 of the Stribeck curve. FIG. 7 shows the relative speed between the web indexer and the web tensioner, which is maintained above the desired threshold speed, as well as the position and speed of the web indexer and the web tensioner.

Turning back to FIG. 1, the processing device 118 of the processing system 100 operates to process a device on the web 102 on the drum 134 of the web indexer 116. In particular, the processing device 118 processes the device to the process position 400 while the desired spot of web is moved to that process position, as shown in FIG. 4. In some embodiments, the processing device is a pick-and-place device that loads electronic components, such as IC chips, onto the desired spots of the web. However, in other embodiments, the processing device may be any processing device that can perform any process on the web at or near the web indexer.

The reeling unit 120 of the processing system 100 operates to reel the web 102, which has been processed by the processing device 118, onto another terminal reel 142. Similar to the de-reeling unit 112, the reeling unit includes mechanisms (not shown) to hold and rotate the terminal reel 142 so that the processed web can be reeled onto the terminal reel 142. After the entire web has been processed and reeled onto the terminal reel 142, the terminal reel with the processed web can be removed from the processing system.

The controller 122 of the processing system 100 operates to control the various components of the system, including the de-reeling unit 112, the web tensioner 114, the web indexer 116, the processing device 118 and the reeling unit 120. In particular, the controller controls the speed or rotation of the web indexer, as well as the speed of the web tensioner. In some embodiments, the controller controls the relative speed between the web indexer and the web tensioner using the motion profile created by the setpoint generator 140. In an embodiment, the setpoint generator may be a computer program running on the controller. In other embodiments, the setpoint generator may be implemented in any combination of software, hardware and firmware. The controller may include one or more processors and/or one or more microcontrollers to process information and control the various components of the processing system.

Figure 8:
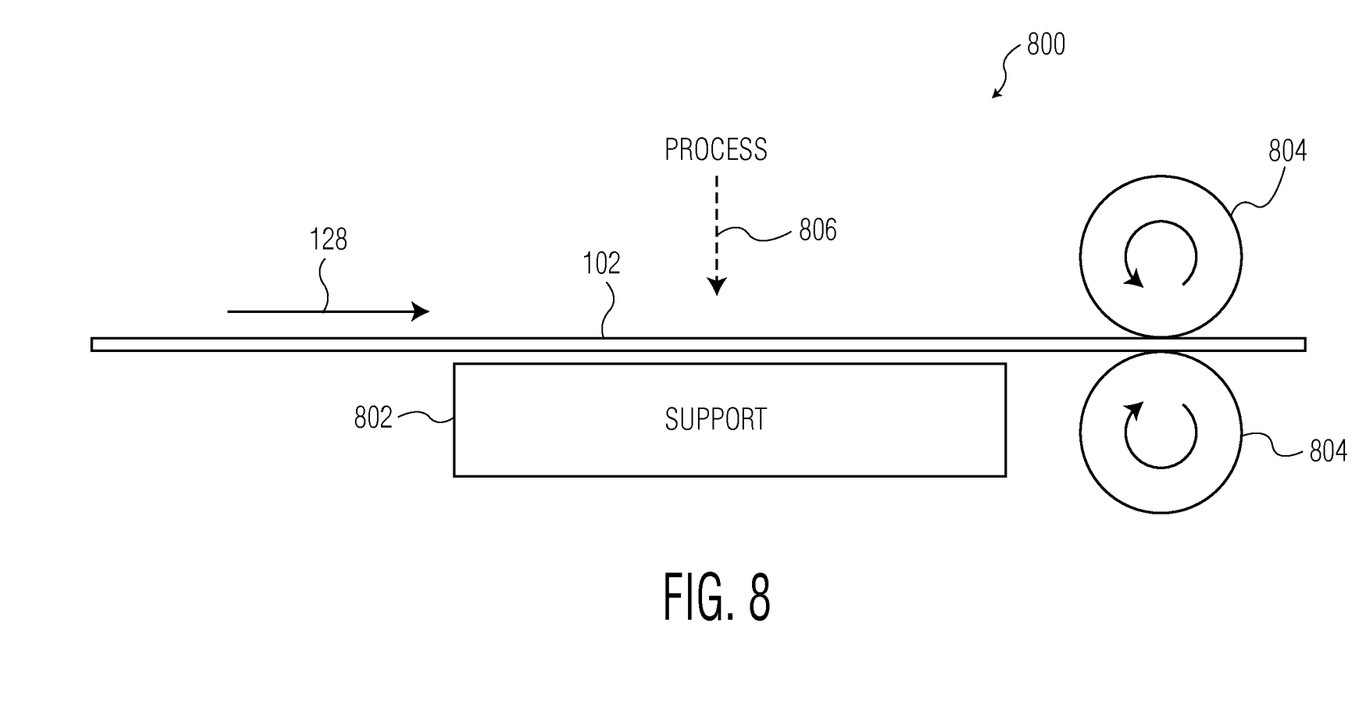
FIG. 8 is a diagram of a linear web indexer that can be used in the processing system in accordance with an embodiment of the invention.

In other embodiments, the web indexer 116 may be a different type of a web indexing device, such as a linear web indexer. FIG. 8 shows one example of a linear web indexer 800 that can be used in the processing system 100 instead of the web indexer 116. As illustrated, the linear web indexer includes a support structure 802 and a pair of rollers 804. The support structure 802 provides support for the web 102 as the web is transported linearly along the transport direction, as indicated by the arrow 128. The rollers 804 operate to intermittently move the web along the transport direction so that the web can be processed when each desired spot or area of the web is moved to a process position, as indicated by the dotted arrow 806. Other types of web indexing device that can accurately transport the web may be used in the processing system.

Figure 9:
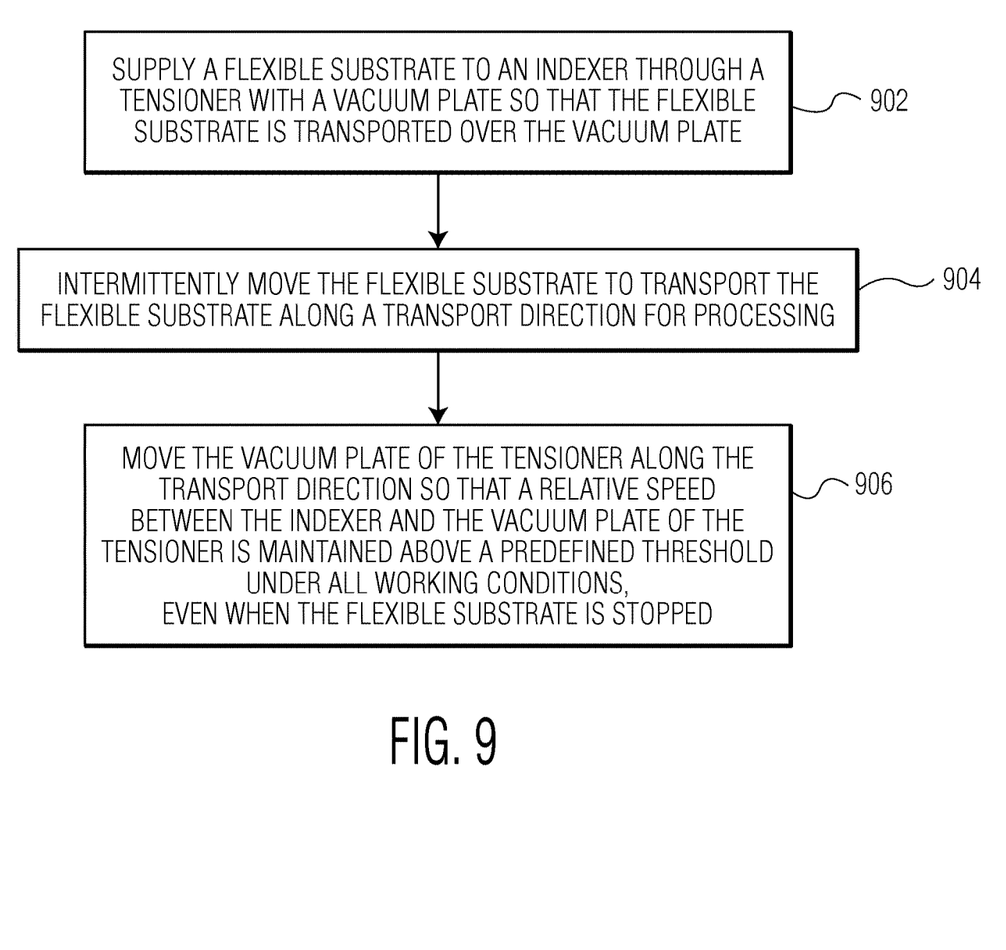
FIG. 9 is a process flow diagram of a method for processing a flexible substrate in accordance with an embodiment of the invention.

FIG. 9 is a process flow diagram of a method for processing a flexible substrate, such as the web 102, in accordance with an embodiment of the invention. At block 902, a flexible substrate is supplied to an indexer, such as the web indexer 116, through a web tensioner with a vacuum plate, such as the web tensioner 114, so that the flexible substrate is transported over the vacuum plate. At block 904, the flexible substrate is intermittently moved along a transport direction for processing. At block 906, the vacuum plate of the tensioner is moved along the transport direction so that a relative speed between the indexer and the vacuum plate of the tensioner is maintained above a predefined threshold under all working conditions, even when the flexible substrate, e.g., the web, is stopped.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A processing system comprising:
a tensioner with a vacuum plate configured to provide tension on a flexible substrate as the flexible substrate is transported over the vacuum plate along a transport direction, said vacuum plate being configured to be moved along the transport direction;
an indexer configured to intermittently move the flexible substrate for processing; and
a controller configured to control the tensioner and the indexer so that a relative speed between the indexer and the vacuum plate of the tensioner is maintained above a predefined threshold under all working conditions, even when the flexible substrate is stopped.

2. The processing system of claim 1, wherein the controller is configured to move the vacuum plate of the tensioner in the opposite direction of the transport direction when the indexer is stopped.

3. The processing system of claim 1, wherein the controller is configured to move the vacuum plate of the tensioner so that the relative speed between the indexer and the vacuum plate of the tensioner is maintained in a linear region of the Stribeck curve.

4. The processing system of claim 3, wherein the processing device is a pick-and-place device that places a device onto the flexible substrate.

5. The processing system of claim 1, further comprising a processing device that performs a process on the flexible substrate on the indexer when the indexer is stopped.

6. The processing system of claim 1, wherein the indexer includes a drum with vacuum holes to move the web as the drum is rotated.

7. The processing system of claim 1, wherein the indexer is a linear indexer.

8. The processing system of claim 1, wherein the tensioner has a curved surface that can be moved in a rotational direction.

9. The processing system of claim 1, wherein the flexible substrate is made of paper, plastic or metal.

10. A method for processing a flexible substrate, the method comprising:
supplying a flexible substrate to an indexer through a tensioner with a vacuum plate so that the flexible substrate is transported over the vacuum plate;
intermittently moving the flexible substrate along a transport direction for processing; and
moving the vacuum plate of the tensioner along the transport direction so that a relative speed between the indexer and the vacuum plate of the tensioner is maintained above a predefined threshold under all working conditions, even when the flexible substrate is stopped.

11. The method of claim 10, wherein the moving of the vacuum plate of the tensioner includes moving the vacuum plate of the tensioner in the opposite direction of the transport direction when the indexer is stopped.

12. The method of claim 10, wherein the moving of the vacuum plate of the tensioner includes moving the vacuum plate of the tensioner so that the relative speed between the indexer and the vacuum plate of the tensioner is maintained in a linear region of the Stribeck curve.

13. The method of claim 10, further comprising performing a process on the flexible substrate on the indexer when the indexer is stopped.

14. The method of claim 13, wherein the processing of the flexible substrate includes placing a device onto the flexible substrate.

15. The method of claim 10, wherein the intermittently moving of the flexible substrate at the indexer includes rotating a drum with vacuum holes of the indexer to move the flexible substrate.

16. The method of claim 10, wherein the intermittently moving of the flexible substrate at the indexer includes linearly moving the flexible substrate at the indexer.

17. A processing system comprising:
a web tensioner with a vacuum plate configured to provide tension on a web as the web is transported over the vacuum plate along a transport direction, said vacuum plate being configured to be moved along the transport direction;
a web indexer including a drum with vacuum holes, the drum being configured to be intermittently rotated to move the web;
a processing device configured to process the web on the drum of the web indexer; and
a controller configured to control the web tensioner and the web indexer so that a relative speed between the drum of the web indexer and the vacuum plate of the web tensioner is maintained above a predefined threshold under all working conditions, even when the web is stopped.

18. The processing system of claim 17, wherein the controller is configured to move the vacuum plate in the opposite direction of the transport direction when the drum of the web indexer is stopped.

19. The processing system of claim 17, wherein the controller is configured to move the vacuum plate of the web tensioner so that the relative speed between the drum of the web indexer and the vacuum plate of the web tensioner is maintained in a linear region of the Stribeck curve.

20. The processing system of claim 17, wherein the processing device is a pick-and-place device that places a device onto the web on the drum of the web indexer.

* * * * *